United States Patent [19]

Winslow

[11] Patent Number: 4,819,950

[45] Date of Patent: Apr. 11, 1989

[54] MECHANICAL SEAL

[76] Inventor: Denis M. W. Winslow, PO Box 8311, Edenglen 1610, South Africa

[21] Appl. No.: 121,282

[22] Filed: Nov. 16, 1987

[30] Foreign Application Priority Data

Nov. 14, 1986 [ZA] South Africa .................. 86/8657

[51] Int. Cl.$^4$ ................... F16J 15/34; F16J 15/48
[52] U.S. Cl. .................................. 277/93 SD; 277/38
[58] Field of Search ............... 277/88, 93 SD, 82, 83, 277/38

[56] References Cited

U.S. PATENT DOCUMENTS

| | | | |
|---|---|---|---|
| 2,559,964 | 7/1951 | Jensen | 277/88 X |
| 4,114,900 | 9/1978 | Wiese | 277/93 SD X |
| 4,509,762 | 4/1985 | Garrett | 277/93 SD X |
| 4,703,939 | 11/1987 | Wentworth | 277/96.2 X |

Primary Examiner—Donald A. Griffin
Attorney, Agent, or Firm—Burns, Doane, Swecker & Mathis

[57] ABSTRACT

The mechanical seal is particularly effective for sealing the shaft of a pump used to pump difficult liquids, such as slurries, relative to the casing through which the shaft passes. The seal has a first rotating sealing member and a second stationary sealing member which are urged together by one or more springs. The springs act between the second sealing member and a reaction member whose axial position is adjustable to take up wear of the sealing faces of the sealing members. A further feature of the seal is the fact that the sealing members and reaction member are removable from the shaft in the form of a unitary cartridge when it becomes necessary to replace worn parts.

5 Claims, 1 Drawing Sheet

U.S. Patent    Apr. 11, 1989    4,819,950
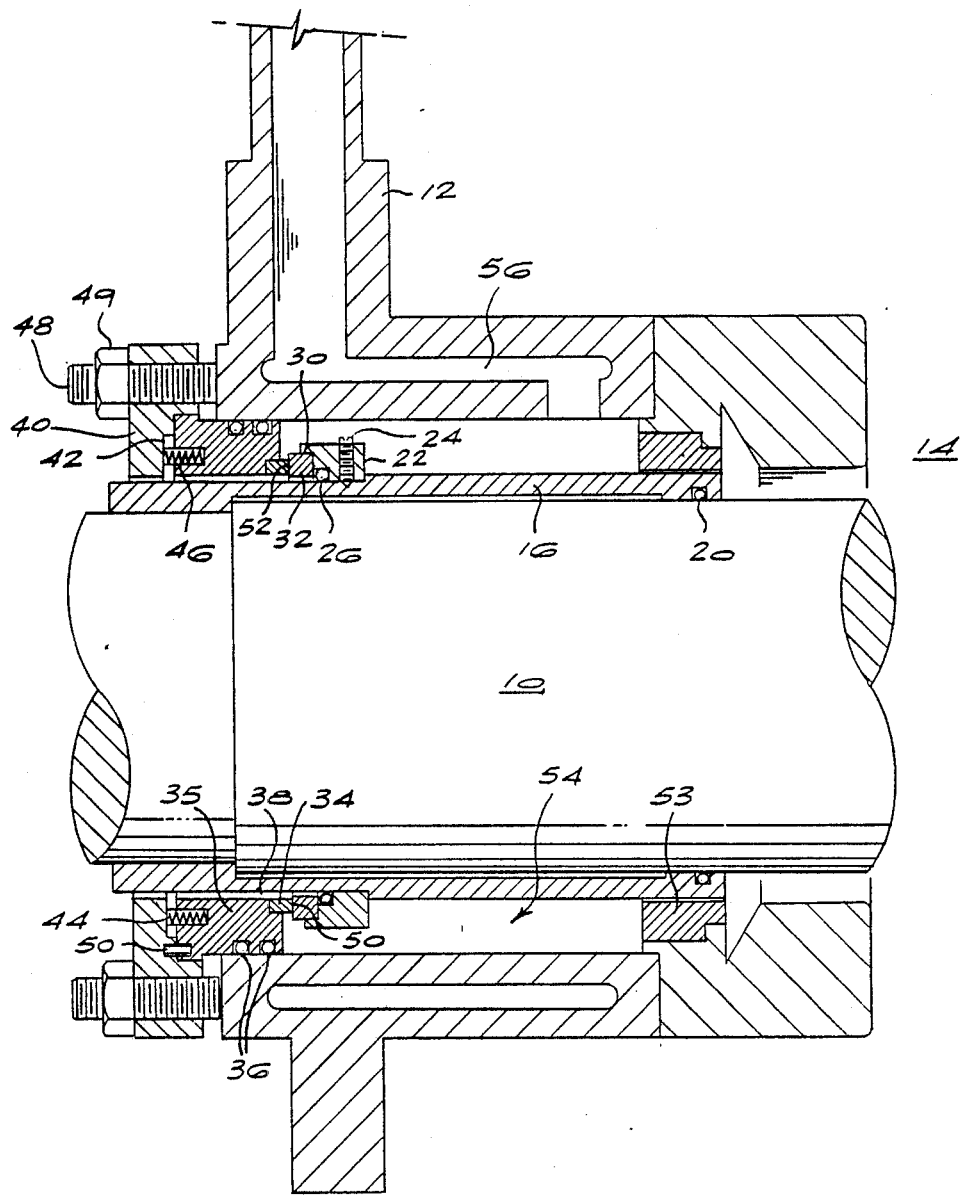

MECHANICAL SEAL

BACKGROUND TO THE INVENTION

This invention relates to a mechanical seal.

It is common for a mechanical seal for a rotating shaft, such as the shaft of a pump, to have a stationary sealing ring and a rotating sealing ring which rotates against the stationary ring. Usually, a spring is provided to press the rings together to achieve an effective seal. As wear takes place between the sealing rings, the spring extends until the spring force is not sufficient to hold the relatively rotating rings in sealing relationship with one another. It is then necessary to strip the seal and replace parts as necessary. Depending on the conditions, this has to be done fairly often. Besides the inconvenience of frequently having to take a pump or the like off line while seal renovation takes place, the conventional mechanical seals are notoriously difficult to strip and replace.

SUMMARY OF THE INVENTION

The invention provides a mechanical shaft seal for sealing a rotatable shaft with respect to a casing through which the shaft passes from the interior to the exterior of a space which will, in operation, contain a pressurised fluid, the seal comprising a first annular sealing member locatable about the shaft so as to rotate with the shaft and a second annular sealing member locatable non-rotatably about the shaft with the first and second sealing members presenting opposing sealing faces, characterised by an annular reaction member locatable about the shaft, means for connecting the reaction member to the casing, one or more springs arranged to bear at one end upon the reaction member and to bear at the opposite end upon the second sealing member thereby to bias the second sealing member towards the first sealing member and cause the sealing faces to make sealing contact with one another, the means for connecting the reaction member to the casing being adjustable to vary the axial position of the reaction member so that the spring or springs are able to apply an appropriate biasing force to the second sealing member for sealing contact between the sealing faces to be maintained as sealing face wear takes place.

Preferably, the second sealing member is located on that side of the first sealing member which is away from the fluid space and the reaction member is located on that side of the second sealing member which is away from the first sealing member.

Preferably also, the seal comprises a cartridge which includes a sleeve connectable releasably about the shaft, the first and second sealing members and the reaction member, the whole cartridge being removable as a unit for replacement of worn parts when necessary.

Rotation preventing means, typically in the form of a pin, can be provided to act between the second sealing member and the reaction member to prevent relative rotation between those components of the seal.

The combination of first and second sealing members may form a downstream end of a service liquid compartment in use, the other end of the service liquid compartment being formed by a bush surrounding the shaft, there being a service liquid passage communicating with the compartment for the introduction of pressurised service liquid serving to isolate the sealing faces from the pressurised fluid in the fluid space.

BRIEF DESCRIPTION OF THE DRAWING

The invention will now be described in more detail with reference to the accompanying drawing which illustrates a mechanical seal of the invention in cross-section.

DESCRIPTION OF A PREFERRED EMBODIMENT

Referring to the drawing, the mechanical seal is used to seal a rotating pump shaft 10 with respect to a pump casing 12 through which the shaft passes from the interior to the exterior of the fluid space 14 in which a conventional impeller (not shown) is located.

The seal includes a round cylindrical sleeve 16 which is held fast on the shaft, typically by means of a grub screw (not shown) and which is sealed with respect to the shaft by an O-ring 20. An annular insert 22 of stainless steel is held fast on the sleeve by grub screws 24 and is sealed with respect to the sleeve by an O-ring 26.

The insert 22 includes an axially projecting rib 30 which retains a first sealing element 32 of annular shape. Together, the insert 22 and the sealing element 32 constitute a first sealing member.

Located about the sleeve downstream of the first sealing member is another sealing member composed of a second annular sealing element 34 which is retained by means of an annular insert 35.

The first and second sealing element 32 and 34 may be of diametrically split construction. The insert 35 is sealed with respect to the pump casing by means of two O-rings 36 and there is a gap 38 between the insert and the sleeve 16.

An annular reaction member 40 is located downstream of the second sealing member 34. The reaction member is formed with a recessed land 42 against which one end of each of a series of helical compression springs 44 act. The opposite ends of the springs locate in spaced pockets 46 in the insert 35. In the drawing, only two springs are visible, but in practice there will be a greater number of springs spaced about the axis of the shaft.

A series of angularly spaced, threaded studs 48 project axially in the downstream direction from the pump casing 12. These studs, of which only two are visible in the drawing, pass through apertures in the reaction member 40 and are fitted with nuts 49 which bear against the reaction member from the downstream side thereof.

The sealing element 34 and insert 35 are thus held non-rotatably but are capable of axial movement. The springs 44 urge the sealing face 50 of the element 34 into sealing engagement with the opposing sealing face 52 of the element 32.

In a typical example, the sealing element 32 will be of a hard metal, such as tungsten carbide, while the sealing element 34 will be of a softer material such as graphite. In operation, the graphite element, being the softer of the two elements, wears relatively rapidly. The springs 44 can take up this wear to a certain extent, but the stage is eventually reached when the springs have extended to such an extent that the spring force is no longer sufficient to maintain good sealing contact between the sealing elements.

At this stage, stripping and refurbishing of the seal would be necessary in the case of a conventional seal. In the present case, however, it is a simple matter to prolong the working life of the seal by adjusting the nuts 49 i.e. threading them further onto the studs 48, so decreasing the spacing between the reaction member 40 and the casing 12. The springs 44 are thus placed under load again and maintain efficient sealing contact between the faces 50, 52.

Note that adjustment of the nuts 48 can take place while the seal is in operation i.e. there is no need to stop the pump.

Eventually, the graphite element 34 will reach the end of its working life, and replacement becomes necessary. With the illustrated arrangement, this is a relatively simple matter. First, the nuts 49 are loosened off. Next the sleeve 16 is released from the shaft 10.

Once the sleeve 16 has been released from the shaft 10, the whole cartridge, composed of the sleeve, insert 22 and sealing element 32, insert 35 and sealing element 34, and reaction member 40 can be withdrawn from the casing 12 along the shaft. Assuming that the motor end of the shaft is disconnected, the whole cartridge can be removed from the shaft and sent to a workshop for replacement of the worn parts. Of course, with the split constructions referred to above, replacement of worn parts could be done on site.

Referring again to the FIGURE, it will be seen that the mechanical seal of the invention includes an axially oriented pin 50 which locates partially in a pocket in the insert 35 and partially in an aligned pocket in the reaction member 40. This pin is provided to prevent any relative rotation between the insert 35 and reaction member 40 at start-up or when the pump is switched off. It will also be noted that the seal includes an annular bush 53 which is, in this case, of brass. Finally, it will be noted that there is a compartment 54 defined between the sealing components at the downstream end and by the bush 52 at the upstream end. A service liquid passage 56 leads into the compartment for the introduction of pressurised service liquid, such as clean water. The service liquid in the compartment acts to prevent the pumped liquid in the space 14 from coming into contact with the sealing faces 50 and 52. A throttling seal can be located about the shaft 10 upstream of the bush 53.

The illustrated mechanical seal is eminently suitable for use in sealing the shaft of a pump which pumps difficult liquids, such as solid-containing slurries or corrosive or abrasive liquids.

I claim:

1. A mechanical shaft seal for sealing a rotatable shaft with respect to a casing through which the shaft passes from the interior to the exterior of a space which will, in operation, contain a pressurised fluid, the seal comprising a first annular sealing member locatable about the shaft so as to rotate with the shaft and a second annular sealing member locatable non-rotatably about the shaft with the first and second sealing members presenting opposing sealing faces, characterised by an annular reaction member locatable about the shaft, means for connecting the reaction member to the casing, one or more springs arranged to bear at one end upon the reaction member and to bear at the opposite end upon the second sealing member thereby to bias the second sealing member towards the first sealing member and cause the sealing faces to make sealing contact with one another, the means for connecting the reaction member to the casing being adjustable to vary the axial position of the reaction member so that the spring or springs are able to apply an appropriate biasing force to the second sealing member for sealing contact between the sealing faces to be maintained as sealing face wear takes place.

2. A mechanical shaft seal according to claim 1, characterised in that the second sealing member is located on that side of the first sealing member which is away from the fluid space and in that the reaction member is located on that side of the second sealing member which is away from the first sealing member.

3. A mechanical shaft seal according to claim 1, characterised in that the seal comprises a cartridge which includes a sleeve connectable releasably about the shaft, the first and second sealing members and the reaction member, the whole cartridge being removable as a unit for replacement of worn parts when necessary.

4. A mechanical shaft seal according to claim 1, characterised in that rotation preventing means are provided to act between the second sealing member and the reaction member to prevent relative rotation between those components of the seal.

5. A mechanical shaft seal according to claim 1, characterised in that the combination of first and second sealing members forms a downstream end of a service liquid compartment in use, the other end of the service liquid compartment being formed by a bush surrounding the shaft, there being a service liquid passage communicating with the compartment for the introduction of pressurised service liquid serving to isolate the sealing faces from the pressurised fluid in the fluid space.

* * * * *